US009966872B2

(12) United States Patent
Luerkens et al.

(10) Patent No.: US 9,966,872 B2
(45) Date of Patent: May 8, 2018

(54) VOLTAGE RECTIFIER WITH SPECIFIC DIODE ARRANGEMENT

(75) Inventors: Peter Luerkens, Eindhoven (NL); Christoph Loef, Eindhoven (NL)

(73) Assignee: KONINKLIJKE PHILIPS N.V.

( * ) Notice: Subject to any disclaimer, the term of this patent is extended or adjusted under 35 U.S.C. 154(b) by 737 days.

(21) Appl. No.: 13/700,447

(22) PCT Filed: May 27, 2011

(86) PCT No.: PCT/IB2011/052331
§ 371 (c)(1),
(2), (4) Date: Nov. 28, 2012

(87) PCT Pub. No.: WO2011/151767
PCT Pub. Date: Dec. 8, 2011

(65) Prior Publication Data
US 2013/0070493 A1 Mar. 21, 2013

(30) Foreign Application Priority Data

Jun. 1, 2010 (EP) .................................... 10164603

(51) Int. Cl.
*H02M 7/10* (2006.01)
*H02M 7/06* (2006.01)

(52) U.S. Cl.
CPC ............. *H02M 7/106* (2013.01); *H02M 7/06* (2013.01)

(58) Field of Classification Search
CPC ....... H02M 7/106; H02M 7/06; H05K 1/0256
USPC .... 363/37, 44, 52, 61, 67, 68, 84, 125, 126; 361/820, 753
See application file for complete search history.

(56) References Cited

U.S. PATENT DOCUMENTS

| 3,123,760 | A | | 3/1964 | Wouk et al. |
| 3,348,105 | A | * | 10/1967 | Doyle ........................... 257/773 |
| 3,750,637 | A | * | 8/1973 | Minks ........................... 123/599 |
| 3,848,174 | A | * | 11/1974 | Thompson et al. ............ 363/68 |
| 4,568,010 | A | | 2/1986 | Dilo |
| 4,569,010 | A | | 2/1986 | Klokkers et al. |
| 4,807,105 | A | * | 2/1989 | Varjasi et al. .................. 363/68 |

(Continued)

FOREIGN PATENT DOCUMENTS

| GB | 1274563 | 5/1972 |
| GB | 1447560 | 8/1976 |

(Continued)

OTHER PUBLICATIONS

"Surface Mount Schottky Barrier Diode", Diodes Incorporated, Document No. DS11007, Rev. 24-2, Aug. 2014, pp. 1-5.

*Primary Examiner* — Kyle J Moody
(74) *Attorney, Agent, or Firm* — Larry Liberchuk

(57) ABSTRACT

The invention is directed to a voltage rectifier (23) comprising at least two diode arrays (33, 34, 35, 36) each comprising plural diodes (33a, 33b, 33p, 34a, 34b, 35a, 35b, 35p, 36a, 36b, 36c, 36d, 36p) connected in series. The diode arrays are arranged in an enclosure (47). The diode arrays are arranged in a special arrangement for providing an even distribution of a field strength. According to an embodiment and with respect to the figures, the vertical distance between an enclosure (47) and the diode arrays (33, 34, 35, 36) increases when horizontally distancing from the direct current terminals. Further, the invention provides a voltage generator (21) and a voltage rectifier (23) having such a voltage rectifier.

26 Claims, 9 Drawing Sheets

(56) References Cited

U.S. PATENT DOCUMENTS

| | | |
|---|---|---|
| 5,576,575 A | 11/1996 | Terasawa |
| 5,602,897 A | 2/1997 | Kociecki et al. |
| 5,631,815 A | 5/1997 | Cross |
| 5,654,208 A * | 8/1997 | Harris et al. .................. 438/522 |
| 5,726,557 A * | 3/1998 | Umeda et al. .................. 322/21 |
| 2008/0151584 A1* | 6/2008 | Wiseman ........................ 363/61 |
| 2009/0039710 A1 | 2/2009 | Beyerlein et al. |
| 2010/0135052 A1* | 6/2010 | Luerkens ........................ 363/61 |
| 2011/0025300 A1 | 2/2011 | Ahmed |
| 2011/0295558 A1 | 12/2011 | Fish et al. |
| 2012/0286396 A1 | 11/2012 | Coyne |
| 2014/0145614 A1 | 5/2014 | Alexanrov |

FOREIGN PATENT DOCUMENTS

| | | | |
|---|---|---|---|
| JP | 62115855 | | 5/1987 |
| WO | WO2005122378 | | 12/2005 |
| WO | WO2007017793 | * | 2/2007 |

* cited by examiner

VOLTAGE RECTIFIER WITH SPECIFIC DIODE ARRANGEMENT

FIELD OF THE INVENTION

The present invention relates to a high voltage rectifier having a specific diode arrangement with an advantageous field strength distribution, a voltage generator and an imaging apparatus having such a high voltage rectifier.

BACKGROUND OF THE INVENTION

High voltage rectifiers are critical components in high power medical X-ray equipment, such as computed tomography or cardio-vascular systems.

There is a strong demand for high power density and high efficiency, which allows smaller and eventually cheaper systems.

There are some limitation factors in achieving this goal. A major problem exists in keeping the field strength under control which puts a natural limit to miniaturization. Another limitation is parasitic capacitances which increase with smaller dimensions and eventually prevent from efficient use of high operating frequency, required for miniaturization of other components in the power chain.

U.S. Pat. No. 4,569,010 discloses a compact high voltage power supply including a high voltage transformer with individual concentric secondary windings connected to form a ladder network with two series-connected assemblies of diode rectifiers respectively located on corresponding sides of the transformer winding. Preferably, successive secondary windings of larger diameter is each made smaller in width, so as to present substantially the same conductive surface area to each next adjacent winding. In this way the corresponding shunt stray capacitances can be made substantially the same magnitude to equalize the reverse potential distribution across the rectifier diodes.

SUMMARY OF THE INVENTION

The object of the present invention is to provide an alternative voltage rectifier, a voltage generator and an imaging apparatus.

This object is solved with a voltage rectifier according to the independent claim. Further embodiments are incorporated in the dependent claims.

According to an embodiment of the invention a high voltage rectifier is provided comprising at least two diode arrays each comprising a plurality of diodes, preferably SiC-diodes, connected in series. The diode arrays are accommodated in an enclosure which is preferably an electrically conducting casing connected to ground. One end of the at least two diode arrays forms a direct current (DC) terminal and the other end forms an alternating current (AC) terminal, respectively. The at least two diode arrays are arranged such that a distance, along a line in parallel to an imaginary line connecting direct current terminals of different polarity, starting outwards from each of the at least two diode arrays to an intersection of the parallel line with an enclosure wall increases with an increasing distance between the parallel line and the imaginary line.

Preferably, one board comprises at least four diode arrays, and the arrangement has preferably the form a rhombus. This embodiment has the advantage that it achieves a constant field strength distribution along the diode arrays in the system, where the geometrical margin grows along the same dimension along which the voltage grows. In other words, due to this specific layout, the sum of the DC voltage amplitude on one side of the diode array and the AC voltage amplitude on the other side of the diode array is kept constant as good as possible along the diode arrays. The AC voltage amplitude is the potential difference caused between the DC voltage terminal and a certain diode of a blocking diode array. The DC voltage amplitude is the potential difference caused between opposing (in a direction in parallel to the imaginary line) diodes of opposing diode arrays. This leads to constant field strength along these diode arrays, which lead to the minimum theoretical fields strength within given dimensions. A field concentration is such avoided as much as possible. Further, the higher the AC voltage amplitude the higher the parasitic capacitance formed in the space between the enclosure and the diode arrays. In this embodiment, this is considered in the layout design such that the distance between the diode array and the enclosure increases with the increasing AC voltage. Thus, a further reduction of a module size is allowed without running into limitations of field strength and parasitic capacitance.

According to a further embodiment, the diode arrays are arranged such that the distance along the parallel line between the at least two diode arrays reduces with an increasing distance from the imaginary line. By providing such a layout, on one hand, the necessary distance between the opposing diode arrays can be kept, in order to avoid an electric shortcut or sparkover between the opposing diode arrays, and on the other hand, the board can be kept geometrically as small as possible.

According to an exemplary embodiment, the diodes of at least one diode array are arranged such that diodes connected in series are repeatedly displaced laterally from an imaginary array centre line in an alternating pattern.

For example, the diodes of at least one diode array are arranged in a zigzag chain pattern or a meander chain pattern.

According to a further embodiment, the voltage rectifier further comprises plural boards each of which carries at least two diode arrays, wherein adjacent boards are arranged such that the terminals of their at least two diode arrays are oriented correspondingly with respect to their polarity. Investigations have shown that nowadays a major part of parasitic capacitance is produced by the fact that interconnection of the boards do not consider minimization of AC fields strength in between. Consequently, an alternative interconnection scheme is proposed that eliminates AC field components between the individual boards and thus minimizing the parasitic capacitance between the boards. The DC voltage difference between the boards becomes now essentially constant which avoids field concentration at the opposite edges. A further consequence of this arrangement is that now parts of the printed circuit boards are opposed, which exhibit the same AC potential variation, which means that there is no AC field anymore between the opposing parts of the board. This effectively reduces parasitic AC capacitance, which otherwise would be detrimental for efficient high frequency operation, required for small high power X-ray generators.

For example, adjacent boards are arranged such that the direct current terminals are oriented correspondingly with respect to their polarity, wherein a series connection of the boards is provided comprising a series connection of direct current terminals of adjacent boards, wherein the connection of the direct current terminals shows a diagonally running connection scheme in the staple direction. The direct current terminals of adjacent boards being close to each other due to the piling or stacking to form a staple, thus have the same polarity. In order to connect direct current terminals via the series connection such that terminals with opposing polarities are connected, the individual connection leads run diagonally from the upper edge or area of one board to the lower edge/area of the following board. It is noted that the terms "upper" and lower" only relate to the drawings and do not define any direction restriction for implementations. Further, it is noted that the connection scheme might just as well run vice versa, i.e. from bottom to top.

According to an exemplary embodiment, at least two boards are provided, and a push-pull capacitor arrangement, comprising a first plurality of series connected capacitors, is provided between the alternating current terminals of adjacent boards. A first part of the first plurality of the series connected capacitors of the push-pull capacitor arrangement is arranged on one board, and a second part of the first plurality of series connected capacitors of the push-pull capacitor arrangement is arranged on an adjacent board. Alternating current input/output connection terminals are provided at the respective ends of the first and the second parts; and wherein a connection is provided between the connection terminals of the respective first and the second parts.

According to an exemplary embodiment, a buffer-capacitor arrangement, comprising a second plurality of series connected capacitors, is provided between the respective direct current terminals of each board.

For example, the capacitors of the push-pull capacitor arrangements and of the buffer-capacitor arrangement are arranged linearly forming push-pull columns and buffer columns; and the electrical potential along the push-pull columns and the buffer columns has the same gradient such that the electrical cross field between the push-pull column and the buffer column has at least predominantly an alternating electrical field component and a minimum direct electrical field component.

According to an exemplary embodiment, the diode arrays are each arranged such that a slanted angle between a centre line of the respective diode array and the push-pull capacitors and the buffer capacitors is provided.

The invention also provides a voltage generator and an imaging apparatus comprising a high voltage rectifier according to one of the above embodiments.

According to an aspect of the invention, a high voltage rectifier module arrangement is provided, which reduces AC and DC field strength by a special arrangement of a number of diodes connected in series, and reduces the parasitic input capacitance of the voltage rectifier furthermore by a special interconnect scheme of the individual rectifier boards. The solution allows miniaturization of high voltage rectifier modules and operation at high frequency, required for efficient and compact high voltage rectifiers for X-ray applications with a high power density.

DETAILED DESCRIPTION OF EMBODIMENTS

Figure 1:
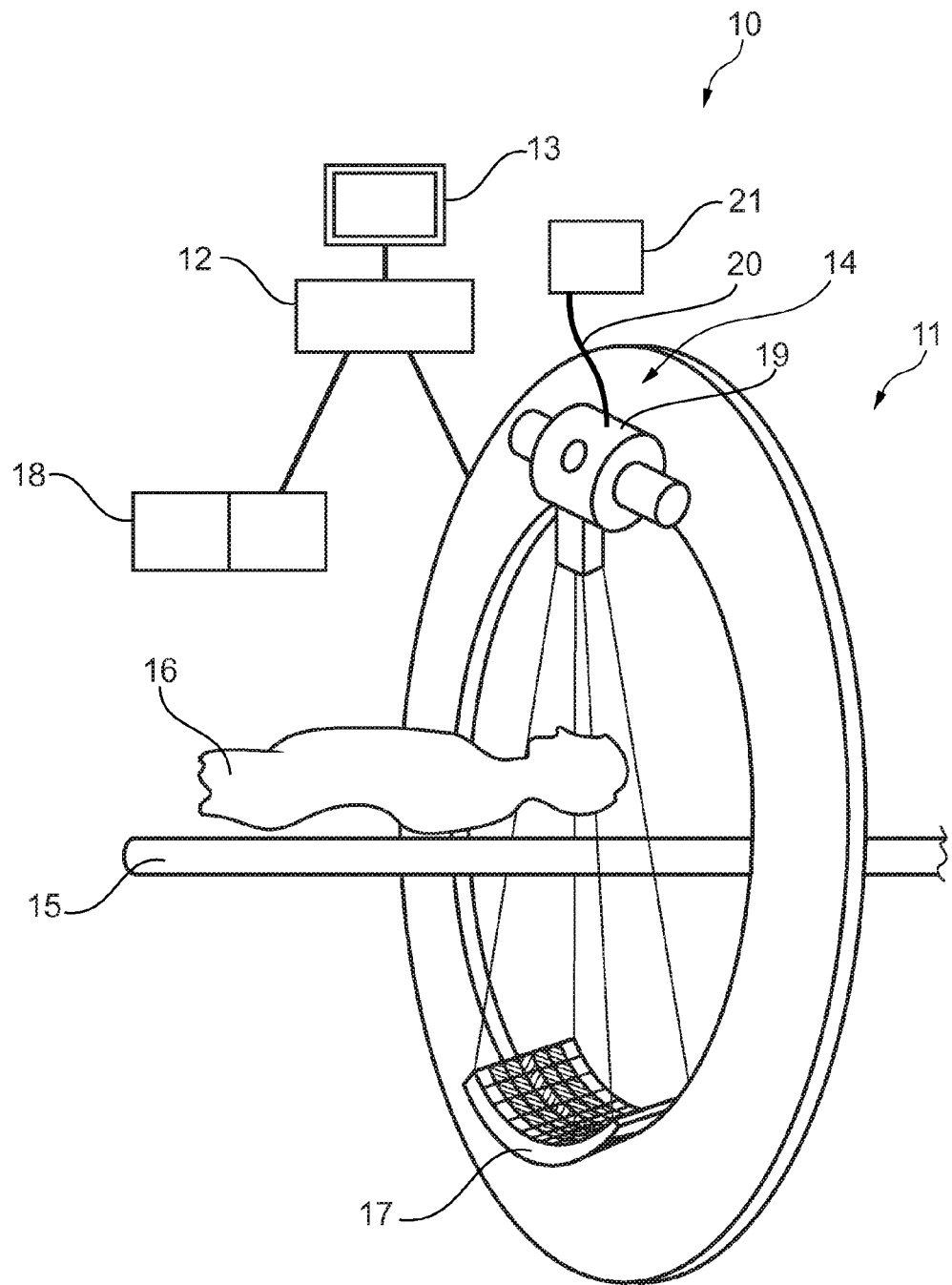
FIG. 1 schematically shows a medical imaging system according to an embodiment of the invention.

FIG. 1 schematically shows a medical imaging system 10 for generating a composite medical view/image in which the below described high voltage rectifier can be used. The medical imaging system 10 comprises an image acquisition device 11, a data processing unit 12 and a display device 13. For example, the medical imaging system is an X-ray imaging system, comprising an X-ray generator 14. The X-ray generator 14 comprises an X-ray tube 19 provided to generate X-ray radiation and a high voltage generator 21 which supplies electric power to the X-ray tube 19 via a high voltage cable 20. In FIG. 1 the X-ray tube 19 and the high voltage generator 21 are schematically illustrated as separate devices, however they can also be integrated in a single housing. A table 15 is provided to receive a patient 16 to be examined. Further, an X-ray image detection module 17 is located opposite the X-ray generator 14. The latter is sending data to the data processing unit 12 which is connected to both, the detection module 17 and the X-ray generator 14. The data processing unit 12 is located in the vicinity of the table 15. Furthermore, the display 13 is arranged in the vicinity of the table 15 to display information to a person operating the X-ray imaging system. Also, an interface unit 18 is arranged to input information or commands by the user. Basically, the image detection module 17 generates image data by exposing the subject to X-ray radiation, wherein said images are further processed in the data processing unit 12. It is noted that the example shown is a so-called CT-type X-ray image acquisition device. The invention also relates to other types of X-ray image acquisition devices, such as CV-type X-ray image acquisition devices.

Figure 2:
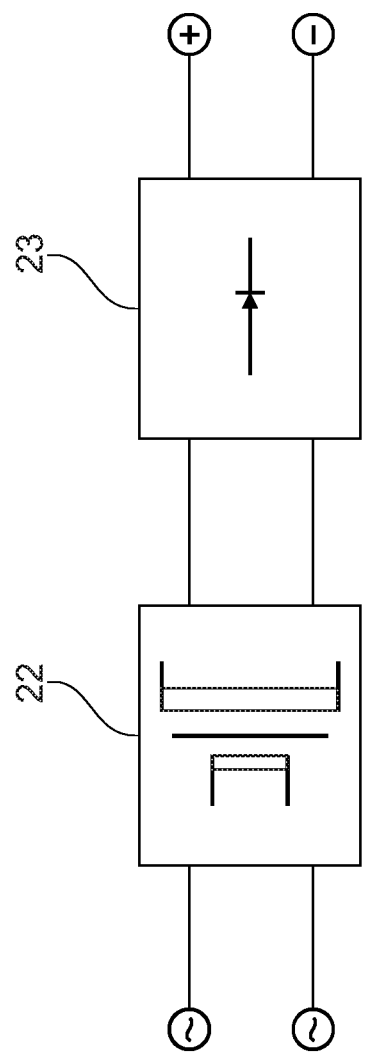
FIG. 2 schematically illustrates some parts of a high voltage generator according to an embodiment of the invention.

FIG. 2 schematically illustrates some parts of the high voltage generator 21. On the left side in FIG. 2, a transformer 22 is supplied on its input side with an AC voltage of several hundred Volts which it transforms to an AC high voltage, such as 50 kV. Electrically downstream of the transformer 22, a high voltage rectifier 23 is provided in preferably a four-stage cascade configuration for rectifying and multiplying the input voltage to a DC output voltage, such as 120-140 kV.

Figure 3:
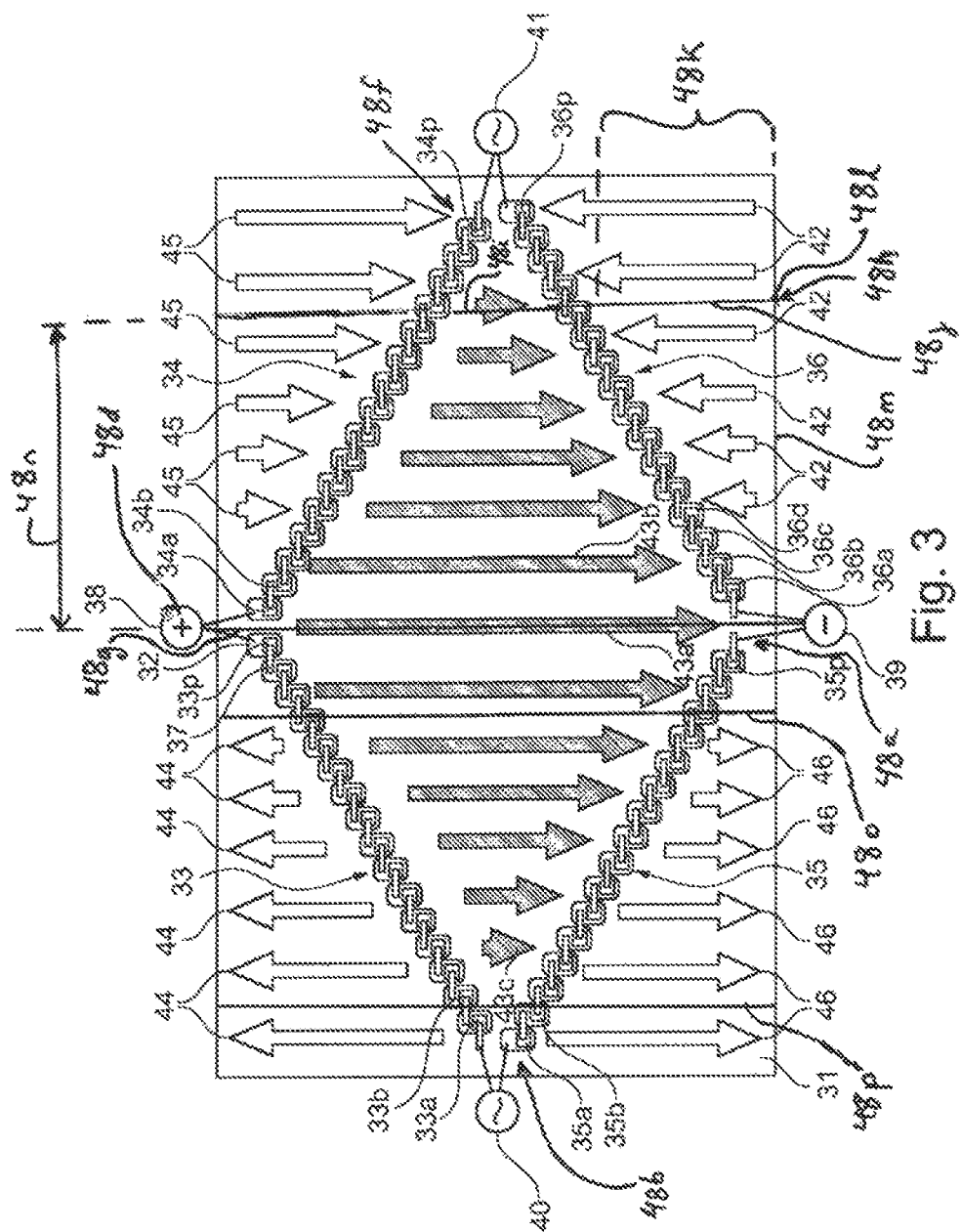
FIG. 3 shows a board of a high voltage rectifier according to an embodiment of the invention.

FIG. 3 shows a board 31 which is preferably a printed circuit board formed of an electrically non-conductive substrate. This figure shows one (of preferably four) rectifier boards 31 exhibiting a diamond or rhombus shaped arrangement of the strings of rectifying diodes. The hollow arrows indicate AC voltage amplitudes in a simplified way. The directions of the arrows indicate the phase relationship, the length the AC amplitude. The hatched arrows indicate DC voltage differences between the end points of the respective arrows, their length and directions indicate the magnitude of the voltage difference and polarity. It is assumed that the system is enclosed by an encapsulation which is electrically conductive and connected to common ground. The board 31 comprises a plurality of conductive areas 32, only one of which is indicated in the FIG. 2 with a reference numeral. The conductive areas 32 are for example formed by etching them from copper sheets laminated onto the board 31. Each conductive area 32 is provided with a diode 33$a$, 33$b$, 33$p$, 34$a$, 34$b$, 35$a$, 35$b$, 35$p$, 36$a$, 36$b$, 36$c$, 36$d$, 36$p$, only some of which are indicated in the figures with reference numerals. The diodes are preferably SiC-diodes (silicon-carbid diodes) which are attached to the conductive areas 32 such that their cathodes are in conductive connection with the respective conductive area 32. The diodes are grouped in diode arrays 33, 34, 35, 36 each comprised of the same amount of diodes—this is 16 diodes per diode array in FIG. 3, but in practice, one diode array 33, 34, 35, 36 might comprise much larger amounts, such as 140 diodes per array. The diodes of each diode array 33, 34, 35, 36 are connected in series by connecting the anode of a diode with the associated conductive area 32 of an adjacent diode by means of a conductive bonding wire 37. The free ends of each diode array 33, 34, 35, 36, i.e. the free cathode/anode of the outermost diodes of each diode array, form terminals for supplying/applying a direct current (DC) or an alternating current (AC). In this context, "free" means that the respective cathode/anode is not connected to an adjacent diode of the same diode array. The diodes of each diode array 33, 34, 35, 36 are preferably arranged along a straight line. However, it is also possible to arrange them along a curved line without departing from the scope of the invention. The diode arrays 33, 34, 35, 36 are arranged such that they preferably form a rhombus or a diamond, but also other shapes such as a square or a parallelogram are possible. The board 31 is preferably of rectangular shape, wherein each corner of the rhombus is located in a border area midway of a different side of the rectangular shape of the board 31, respectively.

The free cathodes of the diode array 33 and 34 are connected and form a terminal 38 for providing a positive DC current with respect to a terminal 39. The free anodes of the diode arrays 35 and 36 are connected and form the terminal 39 for a negative DC current with respect to the terminal 38. Further, the free anode of the diode array 33 and the free cathode of the diode array 35 are connected to form a terminal 40 for an AC voltage. The free anode of the diode array 34 and the free cathode of the diode array 36 are connected to form a terminal 41 for an AC voltage. The actual overall potential of the voltage rectifier 23 depends on the interconnection of the terminals 38 and 39 of different boards 31 within the rectifier cascade as described in connection with FIG. 9.

When applying an AC voltage, supplied from the transformer 22, to the AC terminals 40 and 41, a pulsating DC potential is provided at the DC terminals 38 and 39 according to the following functionality.

In case of the positive half-wave of the AC voltage being present at the AC terminals 40 and 41, for example a positive electric potential is present at the terminal 41 and a negative electric potential is present at the terminal 40. Then the diodes 34$a$, 34$b$, 34$p$ of the diode array 34 conduct current (are in a low-resistive state) such that the terminal 38 is basically at the same electric potential as the terminal 41, since their diodes are arranged such that their cathodes point towards the terminal 38. The diodes 36$a$, 36$b$, 36$c$, 36$d$, 36$p$ of the diode array 36 are in a blocked state (high-resistive state), since its diodes are arranged such that their cathodes point towards the terminal 41. Further, the diodes 33$a$, 33$b$, 33$p$ of the diode array 33 are also in their blocked states (high-resistive states) due to its diodes being arranged with their cathodes pointing towards the terminal 38. Finally, the diodes 35$a$, 35$b$, 35$p$ of the diode array 35 are conductive (low-resistive state) due to the cathodes of its diodes pointing towards terminal 40, thus the DC terminal 39 has basically the same electric potential as the AC terminal 40.

In the inverse case, in which the negative half-wave of the AC voltage is present at the terminals 40 and 41, for example the positive electric potential is present at terminal 40 and the negative electric potential is present at terminal 41. Then, the diode arrays 34 and 35 are in their blocked states, and the diode arrays 33 and 36 are in their conductive states. As a result, the terminals 41 and 39 basically have the same electric potential, and the terminals 38 and 40 basically have the same electric potential.

Thus, the AC voltage applied to the terminals 40 and 41 is rectified to a DC voltage present at the terminals 38 and 39.

The electrical potentials acting during operating the rectifier assembly shown in FIG. 3 are distributed as schematically indicated by hatched and hollow arrows, wherein the hatched arrows illustrate the magnitude of the DC potential and the hollow arrows indicate the magnitude of an AC potential.

When the positive AC potential is present at terminal 41 and the diode array 36 is in its blocked state, the electrical AC potentials increases along the diode array 36. Due to the series arrangement of the diodes within one array, the total AC potential blocked is divided equally on the amount of diodes. When the total AC voltage difference between terminals 39 and 41 is for example 32 kV, the voltage across each of the illustrated diodes is 2 kV. Thus, between the diode 36$a$ and 36$b$ there is an AC potential of 2 kV with respect to the terminal 39, between the diode 36$b$ and 36$c$ there is a potential of 4 kV with respect to terminal 39, between the diode 36$c$ and 36$d$ there is a potential of 6 kV with respect to terminal 39 and so on, up to the potential of 32 kV between the diode 36$p$ and the terminal 39. In other words, the AC potential increases along the diode array 36 starting from terminal 39 towards terminal 41, as indicated by the increasing lengths of the hollow arrows 42. Simultaneously, the diode array 34 is in its conductive state, which means that the positive potential is equal along the entire diode array 34. Thus, no AC potential difference is present along the diode array 34. However, there is also a DC potential acting between the diode array 34 and the diode array 36. This DC potential difference has its largest magnitude between terminal 38 and 39, as indicated by the hatched arrow 43$a$, e.g. for the case that the potential at terminal 38 is 32 kV as assumed above, there is also a DC potential of 32 kV along arrow 43$a$. As mentioned above, the potential between diode 36$b$ and 36$c$ is 4 kV, which reduces the potential difference (compared to the arrow 43$a$) to a magnitude of 28 kV between the diode array 34 and the diode 36$b$, as indicated by a shorter arrow 43$b$. This shrinkage of the DC potential difference continuous like that until is disappears when shifting to the right side in FIG. 3. At the same time, the negative AC potential of terminal 40 is present along the entire diode array and terminal 39. Similarly, to the diode array 36 there is a growing AC potential present along the diode array 33. In more detail, the highest potential difference is acting across the entire diode array 33, since there is a potential difference of for example 32 kV between terminals 38 and 40. Across diode 33a there is an AC potential difference due to the blocking state of 2 kV, thus, the difference to the potential at terminal 38 decreases along the diode array 33 starting from terminal 40 towards terminal 38, as indicated by the hollow arrows 44. Since the potential between diode 33a and 33b is 2 kV, the DC potential difference with respect to the potential of the diode array 35 is relatively small as indicated by the arrow 43c. At the consecutive point between the diode 33b and 33c, the potential is 4 kV and compared to the potential of the diode array 35 becoming larger continuously until the maximal DC potential difference is reached when approaching the last diode 33p as indicated by arrow 43a.

During the negative half-wave of the AC voltage being present at terminals 40 and 41, for example the positive voltage is present at terminal 40 and the negative voltage is present at terminal 41. Then, there is a DC potential between the diode array 33 and the diode array 35 which grows from the terminal 40 towards the terminals 38 and 39, and there is a DC potential between the diode array 34 and the diode array 36 which grows from the terminal 41 towards the terminals 38 and 39, similarly to the above description. There are no AC potentials present at the conducting diode arrays 33 and 36. However, there are AC potentials present at the blocking diode arrays 34 and 35 which grow from the DC terminals 38 and 39 towards the AC terminals 40 and 41, respectively, as indicated by the arrows 45 and 46 and similarly to the above description.

The above described AC and DC potential differences lead to respective electrical field strengths. The higher the electrical AC field strength is, the higher the caused parasitic capacitance. The present invention now considers this distribution of the parasitic capacitances in the special geometrical arrangement of the diodes and the alignment of the diode arrays, i.e. the layout of the board 31. Due to the above described rhombus arrangement, several effects can be achieved. This establishes constant field strength distribution in the system. As can be seen from the arrows in FIG. 3, a large DC potential is opposed to a small AC potential, and a small DC potential is opposed to a large AC potential, such that the resulting total potential of AC and DC component is basically constant along the diode arrays. In other words, the system achieves a constant field strength distribution along the tracks in the system, where the geometrical margin grows along the same dimension along which the voltage grows. This leads to constant field strength along these paths, which lead to the minimum theoretical fields strength within given dimensions. A field concentration is such avoided as much as possible.

Further, in this layout it is considered, that the distance between the DC terminals 38 and 39, where the highest DC potential is present, is largest. Thus, the necessary distance between diodes 33p and 35p, and the distance between diodes 34a and 36a is determined based on the magnitude of the maximal achieved DC potential between the terminals 38 and 39. With decreasing DC potential along imaginary vertical lines (exemplary ones being shown in FIG. 3 by reference numerals 48h, 48o, 48p and referred to herein below as "parallel lines") when moving from the terminals 38 and 39 towards the terminals 40 and 41, the distance between the opposing diode arrays can be decreased. By providing such a layout, on the one hand, the necessary distance between the opposing diode arrays 34 and 36, and the opposing diode arrays 33 and 35 can be kept, in order to avoid an electric shortcut or sparkover between the opposing diode arrays, and on the other hand, the board 31 can be kept geometrically as small as possible.

Figures 6A, 6B:
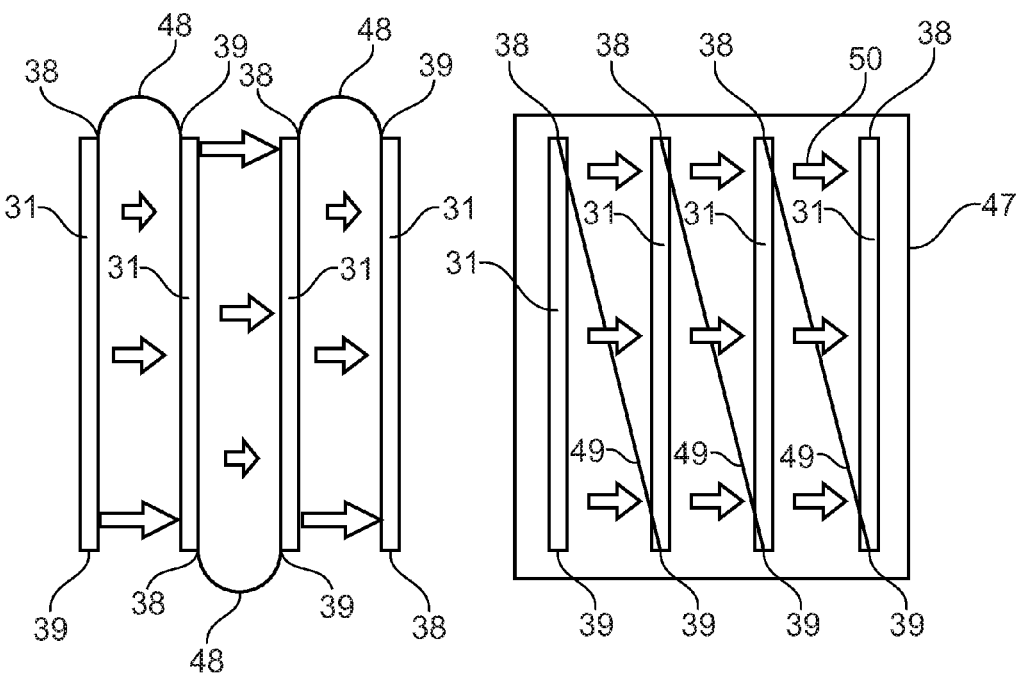
FIG. 6a shows a normal connection scheme of several boards in a high voltage rectifier.
FIG. 6b shows a connection scheme of several boards in the high voltage rectifier according to an embodiment of the invention.

The board 31 is arranged in a grounded encasing 47 (see FIG. 6b). Thus, the same problematic is also considered with respect to the surrounding casing 47. On the one hand, with increasing AC potential, the distance to the upper and lower edge of the board 31, and thus to the surrounding encasing 47, becomes larger such that the AC field strength is kept constant, minimizing parasitic capacitance effect and avoiding risk of sparkover between the diode arrays and the encasing 47, due to high frequency effects. On the other hand, the board 31, and thus the encasing 47, is kept as small as possible. In this respect, in some cases the absolute field strength resulting from the AC and DC potential might even be higher as the DC potential and lead to corona effects.

More specifically, a high voltage rectifier comprises at least two diode arrays, each of said arrays comprising plural diodes connected in series such that each of said arrays has two ends 48a, 48b. Ones of said arrays are joined end-to-end at respective ones of said ends such that, for each of said arrays, one end 48a forms a direct current (DC) terminal and the other end 48b forms an alternating current (AC) terminal, one 38 of the DC terminals being of a polarity 48d that differs from that of another 39 of said DC terminals.

The high voltage rectifier further comprises an enclosure 47 comprising a plurality of walls that collectively surround said at least two diode arrays.

The at least two diode arrays (here there being four designated respectively as 33, 34, 35, 36) are arranged in an arrangement 48f such that, for the imaginary line 48g connecting said one 38 to said another 39 of said terminals and for a line 48h that intersects an array, 34, 36, from among said arrays and that is a parallel line by virtue of being in parallel to said imaginary line, a portion 48i of said parallel line is inside said arrangement, and such that, starting outwards from said arrangement and along a remaining portion 48j of said parallel line, a distance 48k to an intersection 48l of the parallel line with a wall 48m, from among said walls, increases with distance 48n between said parallel line 48h and said imaginary line 48g. Two further exemplary such parallel lines 48o, 48p are shown in FIG. 3, here intersecting the other arrays 33, 35.

In order to form the high voltage rectifier 23, preferably four boards 31 are arranged as a cascade, i.e. in parallel to each other. In order to achieve a high voltage of up to 140 kV, the DC terminals 38 and 39 of the boards 31 are electrically connected in series.

Figure 4:
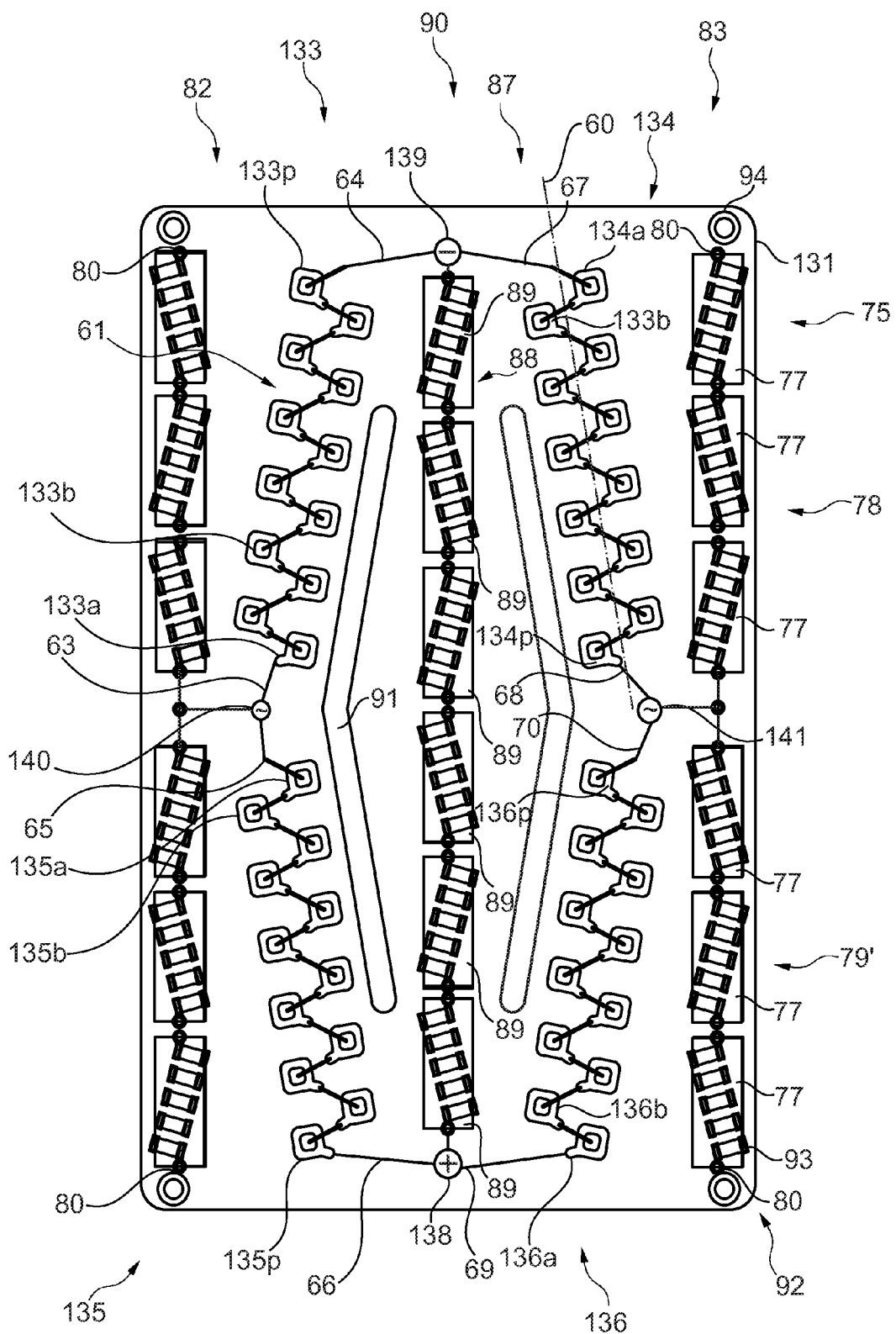
FIG. 4 shows a further example of a board of a high voltage rectifier according to an embodiment of the invention.

According to a further example, the diodes of at least one diode array are arranged such that diodes connected in series are repeatedly displaced laterally from an imaginary array centre line in an alternating pattern. For example, this aspect is shown in FIG. 4. However, it is explicitly noted that FIG. 4 shows different aspects of the invention in one example, although these aspects can be provided separately from each other, as is also reflected in the claims.

FIG. 4 shows a further example of a board 131 which, for example, can be a printed circuit board formed of an electrically non-conductive substrate, as already explained in relation with FIG. 3.

In FIG. 4, also four diode arrays are shown, which, for an easier understanding, are donated with similar reference numbers as those elements in FIG. 3, wherein a further prefix digit "1" has been added, respectively. Thus, the board 131 comprises four diode arrays 133, 134, 135, and 136. Each diode array comprises plural diodes, indicated with reference numerals 133a-p, 134a-p, 135a-p, and 136a-p, which diodes are connected in series.

The diodes connected in series are repeatedly displaced laterally from an imaginary array centre line 60 in an alternating pattern.

The alternating pattern may comprise the alternating repetition of at least two diodes on a respective side of the centre line.

As indicated in FIG. 4, the diode array can be arranged in a zigzag chain pattern 61, in which adjacent arrays are arranged on different sides of the array centre line 60, wherein the term adjacent relates to the series connection.

Figure 5:
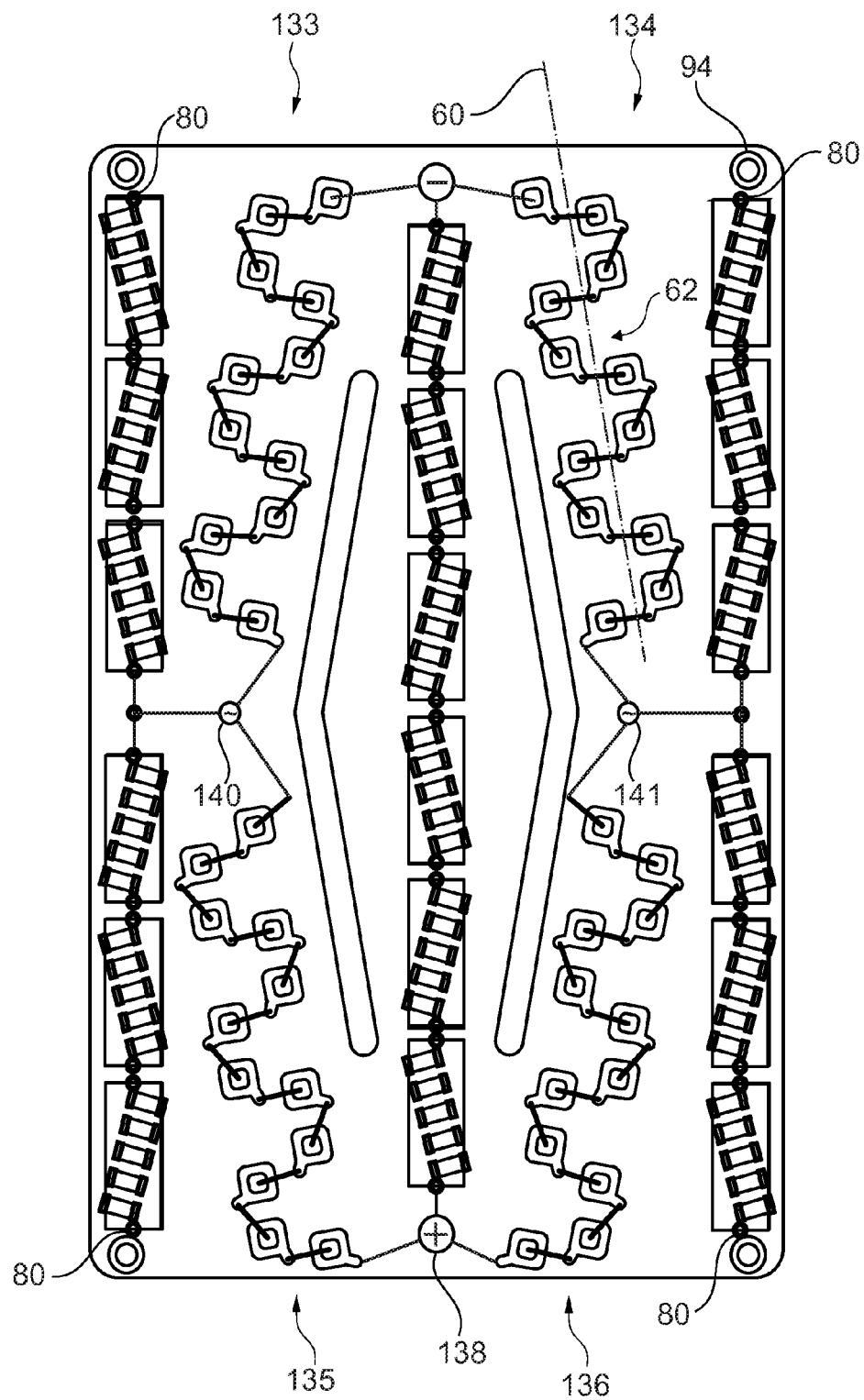
FIG. 5 shows a still further example of a board of a high voltage rectifier according to an embodiment of the invention.

As shown in FIG. 5, the diodes of the diode array can also be arranged in a meander chain pattern 62, in which, for example, two diodes are arranged on one side, followed by two arrays connected also in series, arranged on the other side of the array centre line 60, further followed by further two diodes arranged on the respective other side again, and so forth.

For example, the diode arrays arranged on one board can be arranged in the same type of pattern, as shown for the zigzag chain pattern 61 in FIG. 4, and for the meander chain pattern 62 in FIG. 5.

Of course, it is also possible to provide different type of alternating patterns on one board, or also combined with linear arrangements.

It is further noted that the imaginary array centre line 60, or in case of a linear arrangement, as indicated in FIG. 3, the direction of the respective array can be provided as a straight line or in a curved or otherwise shaped line. In detail, the curvature of the diode arrangement follows the rule, that it creates the least disturbance in the electrical field structure, given by the overall geometric arrangement.

As shown in FIG. 4, the diode arrays are provided with direct current terminals 138, 139 at one end of the array, and the other end is forming an alternating current terminal 140, 141, respectively.

For example, the diode array 133 comprises a first end 63 and a second end 64. The first end 63 is connected to the alternating current terminal 140, to which also a first end 65 of the diode array 135 is connected to. The diode array 135 further comprises a second end 66, which is connected to the direct current terminal 138. The second end 64 of the diode array 133 is connected to the direct current terminal 139. Further, a first end 67 of the diode array 134 is connected to the direct current terminal 139, and a second end 68 of the diode array 134 is connected to the further alternating current terminal 141. Still further, a first end 69 of the diode array 136 is connected to the direct current terminal 138, and a second end 70 of the diode array 136 is connected to a further alternating current terminal 141.

It is noted that the terms "first" and "second" in relation with the end of the diode arrays are used for differentiating the two respective ends from each other, and do not mean any connection order or current transmission direction indication.

For example, the direct current terminal 139 is a connecting terminal for a negative voltage, whereas the direct current terminal 138 is a connection terminal for a positive voltage.

As can be seen from FIGS. 4 and 5, the four diode arrays 133, 134, 135, and 136 may form a rhombus.

Further aspects of the invention are also indicated in FIGS. 4 and 5. However, the features and aspects described in the following do not necessarily have to be combined with the features described above. In particular, the following features can also be combined with features described in relation with FIG. 3, for example.

In FIGS. 4 and 5, although only indicated with reference numerals in FIG. 4, a push-pull capacitor arrangement 75 is provided, comprising a first plurality of series-connected capacitors 77, wherein the push-pull capacitor arrangement 75 is provided between the alternating current terminals of adjacent boards.

Figure 8:
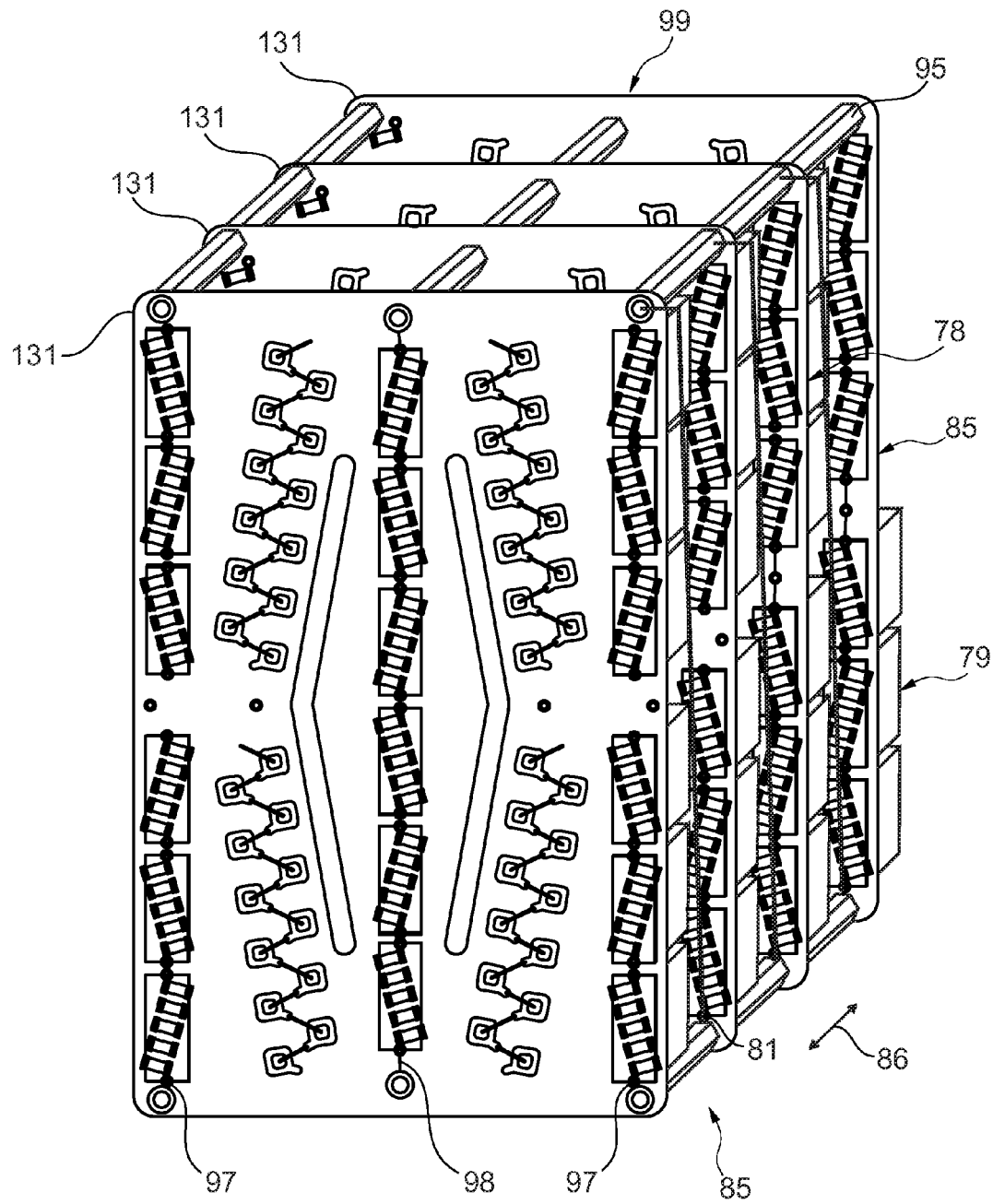
FIG. 8 is a three-dimensional illustration of a further example of a connection scheme.

FIG. 8 shows the arrangement of four boards 131 arranged in an adjacent manner to form a so-to-speak staple.

In case of at least two boards 131, a first part 78 of the first plurality of the series-connected capacitors 77 of the push-pull capacitor arrangement 75 is arranged on one board, and a second part 79 of the first plurality of series-connected capacitors 77 of the push-pull capacitor arrangement 75 is arranged on an adjacent board (see FIG. 8).

Further, alternating current input/output connection terminals 80 are provided at the respective ends of the first and the second part 78, 79. As can be seen in FIG. 4, in combination with FIG. 8, the first part 78 of the capacitors is connected with one end to the alternating current terminals 140, 141, respectively, and with the other end, i.e. the end at the bottom and top, respectively, connected to the connection terminals 80.

To indicate that the lower part of the push-pull column 83 relates to another board, thus forming the second part of the respective arrangement, in FIG. 4, the reference numeral 79 has been supplemented by an apostrophe 79'.

As shown in FIG. 8, a connection 81 is provided between the connection terminals 80 of the respective first and second parts 78, 79.

The term "connection terminals" refers to the connections of the two parts of the capacitors of each capacitor arrangement. In this context, "terminal" does not mean a terminal for outside contact, access or a link, but only inside connection between the two parts. However, a connection to a transformer (not further shown) is provided at the so-to speak entrance of the cascade formed by the arrangement according to the invention.

The first part of the push-pull capacitor arrangement for the diode arrays on the one board is thus provided on the same board, and the second part of the push-pull capacitor arrangement for the diode arrays on the board is provided on an adjacent board.

The first and the second parts are arranged such that the connection 81 runs diagonally in a staple direction from one board to the adjacent board, as indicated in FIG. 8.

For example, a first part of a push-pull capacitor arrangement and a second part of a further push-pull capacitor arrangement are arranged on the respective sides of the boards, thus forming a left column 82 for the diode arrays 133 and 135, and a right column 83 for the diode arrays 134 and 136.

Thus, the connection terminals 80 can be arranged as follows. With respect to FIG. 4, the upper left connection terminal 80 forms an output terminal for an alternating current voltage, the lower left connection terminal 80 forms an input terminal for an alternating current voltage.

The upper right connection terminal 80 forms an output terminal for an alternating current voltage, whereas the lower right connection terminal 80 forms an input terminal for an alternating current voltage. Different to the respective alternating voltages at the left column 82 the alternating voltages at the right column have a phase shift of 180° compared to the voltages at column 82. For simplicity though technically not fully correct, the alternating voltages at column 82 will be furthermore denoted as "positive alternating voltage" and the alternating voltages at column 83 as "negative alternating voltages".

In the examples shown in FIGS. 4, 5 and 8, the push-pull capacitor arrangement 75 is provided with the first plurality of series-connected capacitors 77 on the right side of the board, and a respective further plurality of series-connected capacitors 77 on the left side of the board. As mentioned above, this forms the two columns. The diode arrays are provided as a two-pole cascade, or double-pole cascade, with a cascade part running on the right side of the board and a further cascade part arranged on the left side of the board.

However, according to a further example (not shown), a voltage rectifier arrangement is provided with a single-pole cascade, or unipolar or one-pole cascade, which then only comprises one push-pull capacitor column.

As indicated in FIG. 8, adjacent boards are arranged such that the alternating current input/output connection terminals 80 between the boards are oriented correspondingly with respect to their polarity and with respect to their input/output direction.

This means that in the staple direction, the boards are oriented in the same manner such that with respect to the staple direction, similar terminal types are arranged close to each other.

In order to provide a series connection of the boards, the series connection 81 of the alternating current terminals of adjacent boards via the push-pull capacitor arrangements 75 is provided, wherein the connection between the connection terminals 80 shows a diagonally running connection scheme 85 in the staple direction, which staple direction is indicated with an arrow 86 in FIG. 8.

For example, the push-pull capacitor arrangement may comprise an even number of capacitors. The first part and the second part may comprise the same number of capacitors.

The push-pull capacitor arrangement with an even number of capacitors has an exact midpoint. In case of the alternating current terminal arranged in the middle zone of an edge of the board, the midpoints of the push-pull capacitor arrangement rows are arranged at the end of the board edges and serve as a connection of the second part of the push-pull capacitor arrangement, as described above. The alternating current terminals themselves provide the connection between the push-pull capacitor arrangement column and the rectifier. The alternating current terminals are so-to-speak not led out from the board.

According to a further aspect, as also shown in FIGS. 4 and 8, but which aspect does not necessarily have to be combined with the above-mentioned other aspects and features, a buffer capacitor arrangement 87, comprising a second plurality 88 of series-connected capacitors 89 is provided between the respective direct current terminals 138, 139 of each board.

The capacitors of the buffer capacitor arrangement 87 may be arranged linearly forming a buffer column 90.

In case also the capacitors of the push-pull capacitor arrangements are forming the push-pull columns 82, 83, the electrical potential along the push-pull columns 82, 83 and the buffer columns 90 has the same gradient such that the lateral electrical field, i.e. the component of the electrical field pointing perpendicular to the extension of the capacitor columns between the push-pull column 82, 83 and the buffer column 90, has at least predominantly an alternating electrical field component and a minimum direct electrical field component.

At this point, it is also referred to the respective description of FIG. 3 and the arrows described in relation with FIG. 3, which, however, for the sake of a better understanding, are not shown in FIGS. 4 and 8.

According to a further aspect, not further shown, the diode arrays are each arranged such that a slanted angle between the central or direction lines of the respective diode array and the push-pull capacitors and the buffer capacitors is provided.

Further, it is also possible to provide cut-outs 91 in the printed circuit board which furthermore improve the insulation between the diodes and the buffer capacitor column along the surface of the printed circuit board.

For example, the potential distribution along the push-pull column and the buffer column has the same gradient, such that the lateral electrical field between the push-pull column and the buffer column has no direct component and only an alternating component. The potential distribution along the diode arrays begins at the direct current terminals 138, 139 with the respective direct current potential, wherein the alternating electrical potential is initially zero. The direct component of the potential is the offset along the diode array until it reaches the middle value of the direct current terminals at the alternating current, wherein the alternating component increases gradually up to the one of the push-pull column. For an optimal utilization of the breakdown voltage of the isolation, it is advantageous to arrange the first diodes closely to the direct current potential and the last ones close to the alternating current potential, such that maximum distance to the respective opposite side is provided.

As mentioned above, the first and second parts of the push-pull capacitor arrangements may be arranged on opposing sides of the board, and the buffer capacitor arrangement may be provided in the middle axis of the board.

According to a further aspect, which is also mentioned as a further feature, which can be combined also with above described and below described other features, a third plurality 92 of resistors 93 may be provided for voltage symmetry at the series-connected capacitors 77, 89.

The resistors 93 are shown in FIG. 4 so-to-speak on top of the capacitors, whereas in FIG. 8, it is shown that the resistors 93 are provided on one side of the respective board, whereas the capacitors are arranged on the other side, on the backside in FIG. 8.

Further, FIG. 4 also schematically indicates connection openings 94 in the board 131, which serve as mounting opening for securely mounting the respective boards to a staple, for example with respective distance bushings 95.

According to a further aspect, the resistors 93 may be provided as subgroups, wherein each capacitor is provided with a respective subgroup comprising a plurality of resistors.

Further, the resistors may be arranged in a series connection with respect to each group for each capacitor, wherein the respective resistors are arranged in a linear manner with alternating slanted angles, such forming a further zigzag pattern across the column direction along the board.

It is further noted that the boards in FIG. 3 and the boards in FIGS. 4 and 8 have different orientations with respect to the diode array arrangements. Although the boards 31, 131 are shown to be rectangular, with the shorter sides arranged differently, the boards can also be provided in different shapes, i.e. different proportions, and can also be provided with a square form having equal length of the sides.

In the following, some further aspects of the invention are described. Common high voltage rectifiers for medical X-ray, for example, frequently use voltage multiplier circuits, or cascade rectifiers. In high frequency converters, a large number of relatively fast medium voltage (approximately 1 kV breakdown voltage) silicon rectifier diodes are used. Silicon carbide diodes have a much higher breakdown voltage, for example 4 kV, and have lower losses than the fastest silicon diodes. Thus, for example, high voltage generators may comprise only 200 diodes, showing much lower losses and only one third of the volume of current designs with 1000 to 2000 diodes.

According to an aspect of the invention, the miniaturization of high voltage devices depends on the dielectric strength of insulation materials, which puts limits to the placement of the components in order to avoid flashover and insulation breakdown. The arrangement proposed in the present invention of the components on the boards makes optimal use of the field strength capabilities of the insulation materials (for example, FR4 and insulation oil) and allows the most compact placement of the components.

With respect to FIG. 4, as mentioned before, the zigzag diode chains are starting in the middle of the board closer to the outer edge and approach the buffer capacitor string while leading to the upper and the lower end of the board.

In high voltage cascade rectifiers, the push-pull capacitors are subject to a direct voltage offset, which follows the voltage of the buffer capacitors. To provide only half of the capacitors of the push-pull capacitor arrangements for each array, on one board and the other half of the following board, gives the opportunity to make a connection in a way that the connecting wires are located in an equi-potential plane in the circuit.

Thus, according to the invention, as shown in FIG. 4 et seq., the connection scheme avoids the disadvantage of building up excessive electrical field between the boards.

In addition to the example shown in FIG. 3, not only the high voltage direct current terminals, but also the alternating current connection between the boards uses the same improved scheme as in FIG. 6b.

It is further noted that, of course, the repeating pattern may consist of other number of diodes, for example five or six or any other higher number.

It is further noted that although FIG. 8 shows four boards, other numbers may be applied as well.

With respect to FIG. 8, it is also noted that at the last board, the upper part of the push-pull capacitor chain is omitted, as it would belong to the push-pull function for the next board, which does not exist.

FIG. 8 also shows that alternating current input terminals 97, also referred to as VAC1 and VAC2, are arranged at the bottom at the front of a staple. At the front side bottom there is also a ground connection 98, also referred to as GND, of the module via the (negative) direct current output builds up at the upper side and leaves the stack the rearmost board, indicated with reference numeral 99.

FIG. 6a shows a normal series connection scheme of four boards, wherein the connections are made alternatively on the top and the bottom side of the boards. In this connection scheme, the positive DC terminal 38 of the very left board 31 is connected with the negative DC terminal 39 of the adjacent board 31 by a connection line 48. For this purpose, adjacent boards have to be turned relative to each other by 180 degrees about a center normal of the boards 31. Accordingly, the remaining boards 31 are connected such that the positive DC terminal 38 is connected with a negative DC terminal 39 of a consecutive board 31. The resulting total voltage of the high voltage rectifier 23 is provided at the DC terminals 38 and 39 at the bottom side of the outermost boards 31. However, this arrangement has the drawback that there is no potential difference between the DC terminals 38 and 39 of consecutive boards 31, since they are connected by the connection lines 48. Starting from this connected side of the boards 31 (in case of the two left boards the upper sides) towards the opposite side of the boards 31 (in this case of the two left boards the lower sides) the potential difference between the opposing spots of two adjacent boards 31 increases, as indicated by the growing arrows. This leads to an uneven distribution of the electrical field strength between adjacent boards. Accordingly, the distance between two adjacent boards 31 has to be dimensioned according to the largest field strength concentration.

Figure 7:
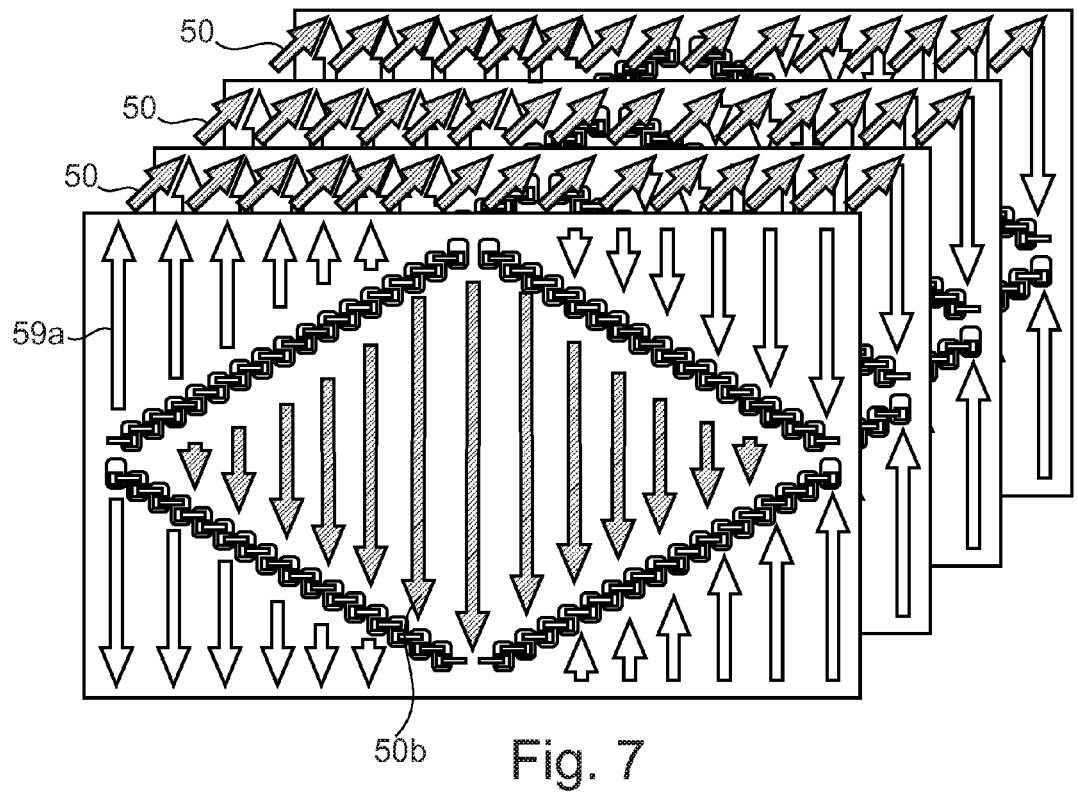
FIG. 7 is a three-dimensional illustration of the main components of the resulting electrical fields according to the exemplary connection scheme of FIG. 6b.

FIG. 6b shows the connection scheme according to an embodiment of the present invention, and FIG. 7 shows this connection scheme in a three-dimensional view and the associated main components of the electrical field, wherein, for example, alternating components are indicated with gray arrows 59a, respectively arrows filled with a pattern, and direct components are indicated with white, respectively unfilled or hollow arrows 59b.

The boards shown in FIG. 7 are identical to the one described in FIG. 3, thus reference signs are omitted. In this connection scheme all of the boards 31 are oriented equally, i.e. all boards 31 are arranged such that their positive DC terminals 38 point in same direction, and their negative DC terminals 39 point in the same direction. The positive DC terminal 38 of the boards 31, which is the one on the top side of the boards 31 in FIG. 6b, is connected by a connection wire 49 with the negative DC terminal 39 of the respective adjacent board 31. The resulting total voltage of the high voltage rectifier 23 is provided at the DC terminals 38 and 39 at the left bottom side and the right top side of the outermost boards 31. In this arrangement, the potential difference between the opposing spots of two adjacent boards 31 is kept constant, as indicated by equally sized arrows 50 only one of which is marked in FIG. 6b. FIG. 7 shows the equalized distribution of the field strength between adjacent boards 31 in a three-dimensional view by means of the arrows 50 only some of them are marked in FIG. 7. Due to the even distribution of the electrical field strength, the distance between two adjacent boards 31 can be decreased compared to the arrangement of FIG. 6a.

Figure 9:
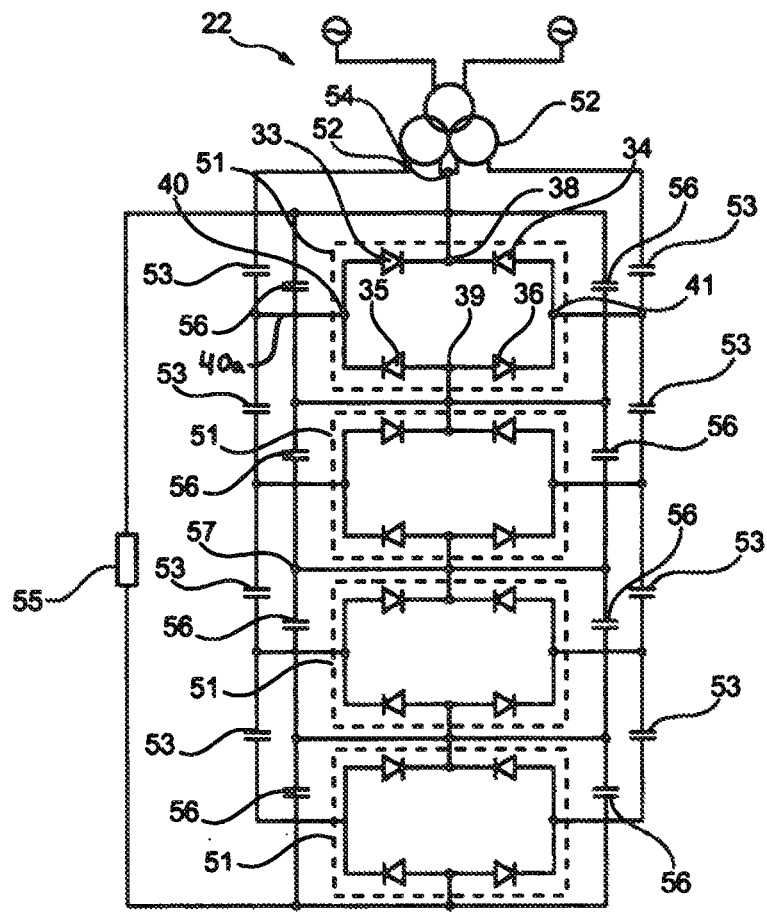
FIG. 9 shows a circuit diagram of implementing the voltage rectifier according to an embodiment of the invention.

FIG. 9 shows a circuit diagram of implementing the voltage rectifier according to the above described embodiment. The shown example is a double-pulse 4-stage-cascade rectifier, wherein reference numeral 51 indicates a stage, each of which is designed as the above described board 31. FIG. 9 focuses on the electrical integration and does not show the above described diamond arrangement of the diode arrays. Each diode array 33, 34, 35, 36 is illustrated in FIG. 9 as a single diode. For reasons of clarity only the electronic parts of one stage 51 are provided with reference numerals in FIG. 9. As described above, the transformer 22 is supplied on its input side with an AC voltage which it transforms to a higher AC voltage at the output side terminals 52. The output side terminals 52 of the transformer 22 are connected with the terminals 40 and 41 of each stage 51. In this path, the lines, e.g., line 40a, are configured for providing a source of AC for rectification by the FIG. 9 rectifier. Referring to FIGS. 3 and 9, the line 40a is a third connection to terminal 40 (or the "AC terminal node 40"), the first two leading from the respective ends 48b of the adjoining diodes arrays 33, 35. Between the terminals 52 and the terminals 40 and 41 of the first stage 51 (uppermost stage 51 in FIG. 9), there is provided a push-pull capacitor 53. Also, between the terminals 40 of each stage 51 and between the terminals 41 of each stage, there is provided a push-pull capacitor 53. The functionality of the push-pull capacitors 53 is known from the state of the art. As can be seen in FIG. 9, the stages 51 are connected in a chain by means of the push-pull capacitors 53. Further, the terminal 38 of the first stage 51 is connected to common ground, for example via a terminal 54 of the transformer 22 and to one side of a load 55, for example an X-ray tube 19. The terminal 39 of the first stage 51 is connected with the terminal 38 of the second stage 51 and so on in order to realize the above described series connection of the stages 51 with respect to their terminals 38 and 39. Between the terminals 38 and 39 of each stage 51, there are provided two buffer capacitors 56 arranged in parallel (or a single buffer capacitor), the functionality of which is known from the state of the art. With this arrangement, the load 55 is provided on one side (upper side in FIG. 9) with ground and on the other side with a high negative DC voltage. Alternatively, the arrangement could also be switched such that the load is provided on one side with ground and on the other side with a high positive DC voltage. For this purpose, the terminals 52 of the transformer 22 would be connected with the terminals 40 and 41 of the lowermost stage 51 in FIG. 9 with the respective push-pull capacitors 53 arranged in between. Additionally, the ground terminal 54 would be connected with terminal 39 of the lowermost stage 51 in FIG. 9 instead of terminal 38 of the uppermost stage 51. Another way to achieve a positive output polarity is to invert the orientation of all diodes in FIG. 9. The aforementioned arrangements are so called unipolar arrangements. Also, a bipolar arrangement could be realized by connecting the connection 57 with common ground, wherein connection 57 represents the connection between the two center stages 51.

Figure 10:
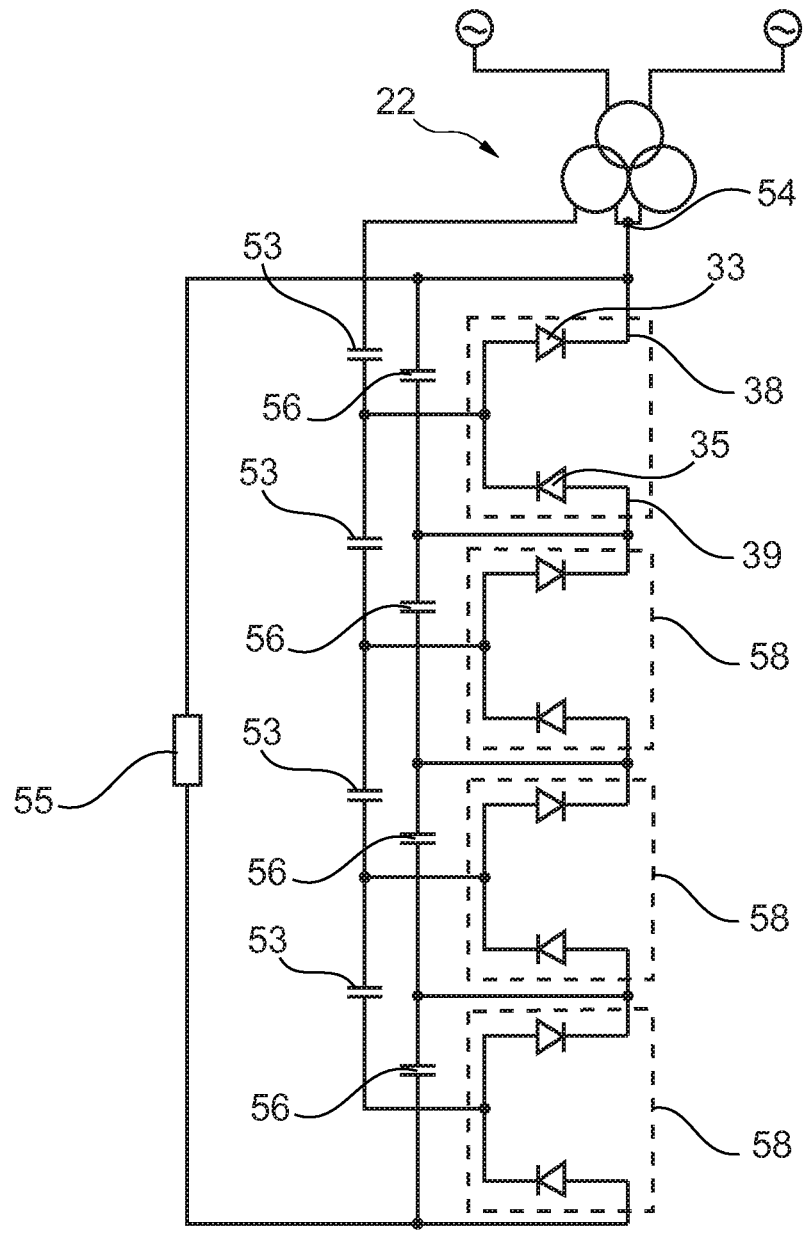
FIG. 10 illustrates a circuit diagram of implementing a voltage rectifier according to another embodiment of the invention.

FIG. 10 illustrates a circuit diagram of implementing a voltage rectifier according to another embodiment of the invention. The shown example is a single-pulse 4-stage-cascade rectifier, wherein reference numeral 58 indicates a stage, each of which is designed as the left half of the above described board 31. Thus, one stage 58 only comprises the two diode arrays 33 and 35 with their terminals 38, 39 and 40. This way, at the terminals 38 and 39 only a single pulse during the time of one complete 360 degree cycle of the AC output voltage of the transformer 22 is produced. The geometrical arrangement of the diode arrays 33 and 35 is as described in connection with FIG. 3. In this case, the described rhombus shape leads to the shape of a half rhombus. Since FIG. 10 focuses on the electrical integration, this geometrical arrangement is not shown in FIG. 10. Each diode array 33 and 35 is illustrated in FIG. 10 as a single diode. For reasons of clarity only the electronic parts of one stage 58 are provided with reference numerals in FIG. 10. With respect to the remaining parts it is referred to the above description of FIG. 9.

The invention is preferably applied in compact high power, and possibly, high frequency high voltage generators for X-ray applications. In particular the diamond-shape is preferably useful in SiC-based high voltage rectifiers, because the high voltage capabilities of SiC-diodes help to reduce the number of individual diodes sufficiently to get the required freedom of design for the geometrical arrangement. The interconnect scheme is useful also for Si-based HV rectifiers.

It is explicitly intended that the teaching of this invention covers any combination of the above described embodiments.

While the invention has been illustrated and described in detail in the drawings and foregoing description, such illustration and description are to be considered illustrative or exemplary and not restrictive and it is not intended to limit the invention to the disclosed embodiments. The mere fact that certain measures are recited in mutually different dependent claims does not indicate that a combination of these measures cannot be used advantageously. Any reference signs in the claims should not be construed as limiting the scope of the invention.

The invention claimed is:

1. A high voltage rectifier comprising:
a plurality of diode arrays, each of said plurality of diode arrays comprising a plurality of diodes connected in series such that each of said plurality of diode arrays has a first end and second end, wherein said first ends of some of the plurality of diode arrays are connected together to provide a first direct current (DC) terminal and said second ends of the some of the plurality of diode arrays provide a first alternating current (AC) terminal, and wherein said first ends of others of the plurality of diode arrays are connected together to provide a second DC terminal and said second ends of the others of the plurality of diode arrays provide a second AC terminal, one of the first and second DC terminals being of different polarities; and
an enclosure comprising a plurality of walls that collectively surround said plurality of diode arrays,
wherein said plurality of diode arrays are arranged in an arrangement such that, for a single imaginary line connecting said first and second DC terminals, and for parallel lines that intersect a diode array from among said plurality of diode arrays at varying distances from and in parallel to said single imaginary line, a portion of each said parallel line is inside said arrangement, and a distance to an intersection of each said parallel line with a wall of the plurality of walls increases as distance between each said parallel line and said single imaginary line increases.

2. The high voltage rectifier according to claim 1, wherein said portion of each said parallel line inside said arrangement decreases with increasing distance between said parallel line and said single imaginary line.

3. The high voltage rectifier according to claim 1, wherein said plurality of diodes of at least one of said plurality of diode arrays are arranged such that they are displaced laterally from an imaginary array center line of the at least one of said plurality diode arrays in an alternating pattern.

4. The high voltage rectifier according to claim 1, wherein said plurality of diodes of said at least one of said plurality of diode arrays are arranged in a zigzag chain pattern or a meander chain pattern along the said at least one of said plurality of diode arrays.

5. The high voltage rectifier according to claim 1, further comprising a plurality of boards, each of which carries two or more diode arrays, each of said two or more diode arrays being a diode array from among said plurality of diode arrays, said boards being arranged serially in adjacency, wherein a pair of said boards in immediate adjacency are arranged such that at least the first and second DC terminals of one of said pair are oriented, in relation to the first and second DC terminals of the other one of said pair, correspondingly with respect to their polarity.

6. The high voltage rectifier according to claim 5, wherein said boards are spatially arranged such that the first and second DC terminals are oriented correspondingly board-to-board with respect to their respective polarities, said high voltage rectifier further comprising a series connection that connects the boards, said series connection comprising a series connection of the first and second DC terminals of ones of said boards in immediate adjacency, said first and second DC terminals having opposing polarities, wherein the first and second DC terminals are connected so as to exhibit a diagonally running connection scheme in a staple direction.

7. The high voltage rectifier according to claim 1, wherein said plurality of diode arrays amount to at least four diode arrays, said high voltage rectifier further comprising a board that comprises said at least four diode arrays.

8. The high voltage rectifier according to claim 7, wherein said at least four diode arrays are spatially arranged so as to form a rhombus.

9. The high voltage rectifier according to claim 1, wherein some of said plurality of diodes are silicon-carbide diodes.

10. The high voltage rectifier according to claim 1, further comprising:
   at least two boards arranged serially; and
   a push-pull capacitor arrangement, comprising, between the first and second AC terminals of a pair of boards of immediate adjacency, a first plurality of series connected capacitors; wherein a first part of said first plurality is arranged on one board of said pair of boards, and a second part of said first plurality is arranged on the other board of said pair, the first and second parts both having respective first and second ends.

11. The high voltage rectifier according to claim 10, wherein said first and second AC terminals are disposed between said pair of boards and have respective polarity and at least one of input or output direction; wherein said pair of boards are arranged such that said first and second AC terminals are oriented correspondingly with respect to their polarity and with respect to their at least one of input or output direction; and wherein a series connection of said pair of boards comprises a series connection of said first and second AC terminals via the push-pull capacitor arrangement, wherein a connection between said first and second AC connection terminals shows a diagonally running connection scheme in a staple direction.

12. The high voltage rectifier according to claim 11, said capacitors of said push-pull capacitor arrangement on opposite sides of a given board from among said at least two boards having, overall, side-specific center lines; buffer capacitors on said given board having, overall, a center line; and an array of diodes that is connected in series on said given board having a center line,
   wherein said array of diodes on said given board is arranged such that a slanted angle exists between each of the respective center lines of the capacitors and the center line of the array of diodes, said angle further existing between the respective center lines of the buffer capacitors and the center line of the array of diodes.

13. The high voltage rectifier according to claim 10, wherein a buffer-capacitor arrangement, comprising a second plurality of series connected capacitors, is provided between respective first and second DC terminals of each board.

14. The high voltage rectifier according to claim 13, wherein the capacitors of said push-pull capacitor arrangement and of said buffer-capacitor arrangement are arranged linearly forming a push-pull column and a buffer column; and wherein an electrical potential along the push-pull column and the buffer column has a same gradient such that a lateral electrical field between the push-pull column and the buffer column has at least predominantly an alternating electrical field component and a minimum direct electrical field component.

15. The high voltage rectifier of claim 1, said first and second ends of said plurality of diode arrays are joined such that said plurality of diode arrays are arranged in a closed loop pattern.

16. The high voltage rectifier of claim 1, wherein said enclosure is an electrically conducting casing connected to ground.

17. The high voltage rectifier of claim 1, wherein the connection in series comprises direct connection of the plurality of diodes to each other consecutively.

18. The high voltage rectifier of claim 1, configured for yielding, at one of the first and second DC terminals, voltage sufficiently high for powering an X-ray tube.

19. An electrical device comprising:
   a high voltage rectifier comprising a plurality of diode arrays, each of said plurality of diode arrays comprising a plurality of diodes connected in series between a first end and a second end of the corresponding diode array, wherein some of said plurality of diode arrays are connected together at the first ends to provide a direct current (DC) terminal and are connected at the second ends to other diode arrays of the plurality of diode arrays to provide an alternating current (AC) terminal; and
   a line configured for providing a source of AC for rectification by said high voltage rectifier, wherein a connection node defining a physical connection between the first and second ends of the some of the diode arrays and the other diode arrays, is connected to said line.

20. The high voltage rectifier of claim 19, wherein said plurality of diode arrays are connected in a closed loop pattern.

21. A high voltage rectifier comprising:
   an interconnected plurality of diode arrays, each diode array comprising a plurality of diodes connected in series between a first end and a second end of the diode array; and
   an enclosure comprising a plurality of walls that surround the plurality of diode arrays,
   wherein the first ends of two diode arrays of the plurality of diode arrays are connected to form a first direct current (DC) terminal, and the second ends of two other diode arrays of the plurality of diode arrays are connected to form a second DC terminal having an different polarity than the first DC terminal, an imaginary line passing through the first and second DC terminals,
   wherein the second ends of the two diode arrays forming the first DC terminal are connected to the first ends of the two other diode arrays forming the second DC terminal, respectively, to form a first alternating current (AC) terminal and a second AC terminal, and
   wherein distances, indicated by parallel lines intersecting at least two arrays of the plurality of arrays and parallel to the imaginary line, between the at least two arrays reduce as distances of the parallel lines from the imaginary line increase, respectively.

22. The high voltage rectifier of claim 21, wherein said enclosure is an electrically conducting casing connected to ground.

23. The high voltage rectifier of claim 21, wherein the plurality of diodes connected in series entails direct connection of the plurality of diodes to each other consecutively.

24. The high voltage rectifier of claim 21, configured for yielding, at one of the first and second DC terminals, voltage sufficiently high for powering an X-ray tube.

25. The high voltage rectifier of claim 21, wherein distances, indicated by the parallel lines intersecting at least two arrays of the plurality of arrays and parallel to the imaginary line, from the at least two arrays to a wall of the enclosure increase as distances of the parallel lines from the imaginary line increase, respectively.

26. The high voltage rectifier of claim 21, wherein the first end of each diode array has a free cathode and the second end of each diode array has a free anode, and
  wherein the first DC terminal provides a positive DC current with respect to the second DC terminal.

* * * * *